(12) United States Patent
MacNeille et al.

(10) Patent No.: US 10,820,175 B2
(45) Date of Patent: Oct. 27, 2020

(54) VEHICLE COMMUNICATION WITH ANT-SIZED RADIO DEVICES

(71) Applicant: Ford Global Technologies, LLC, Dearborn, MI (US)

(72) Inventors: Perry Robinson MacNeille, Lathrup Village, MI (US); Omar Makke, Oakland, MI (US); Jeffrey Yeung, Canton, MI (US); Yimin Liu, Ann Arbor, MI (US); Oleg Yurievitch Gusikhin, West Bloomfield, MI (US); Ayush Shah, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/609,058

(22) PCT Filed: Apr. 27, 2017

(86) PCT No.: PCT/US2017/029868
§ 371 (c)(1),
(2) Date: Oct. 28, 2019

(87) PCT Pub. No.: WO2018/199957
PCT Pub. Date: Nov. 1, 2018

(65) Prior Publication Data
US 2020/0059769 A1 Feb. 20, 2020

(51) Int. Cl.
*H04W 4/48* (2018.01)
*H01Q 3/38* (2006.01)
*H04W 4/80* (2018.01)

(52) U.S. Cl.
CPC ............... *H04W 4/48* (2018.02); *H01Q 3/38* (2013.01); *H04W 4/80* (2018.02)

(58) Field of Classification Search
CPC combination set(s) only.
See application file for complete search history.

(56) References Cited

U.S. PATENT DOCUMENTS 5,023,617 A * 6/1991 Deering ............... G01S 13/931
342/70
6,597,312 B1 * 7/2003 Hrycak .................... H01Q 3/30
342/372

(Continued)

FOREIGN PATENT DOCUMENTS

CN 104144526 A 11/2014

OTHER PUBLICATIONS

Abate, "Stanford engineers aim to connect the world with ant-sized radios", Stanford Report, Sep. 9, 2014, http://news.stanford.edu/news/2014/september/ant-radio-arbabian-09091.

(Continued)

*Primary Examiner* — Yuwen Pan
*Assistant Examiner* — Erica L Fleming-Hall
(74) *Attorney, Agent, or Firm* — Brandon Hicks; Bejin Bieneman PLC

(57) ABSTRACT

A computer that is programmed to: receive a request from a communication module in a vehicle to communicate with an ant-sized radio (ASR) device in the vehicle; in response to the request, concurrently steer two different radio frequency (RF) beams onto the ASR device; and based on steering the beams: transmit an instruction to the ASR device, or provide sensor data received from the ASR device to the module.

19 Claims, 5 Drawing Sheets

(56) References Cited

U.S. PATENT DOCUMENTS

| | | | |
|---|---|---|---|
| 8,286,473 B2 | 10/2012 | Rensel et al. | |
| 9,378,448 B2* | 6/2016 | Ching | G06K 19/0715 |
| 9,529,076 B2 | 12/2016 | Subramanian et al. | |
| 10,627,507 B1* | 4/2020 | Parker | H01Q 3/38 |
| 2003/0120442 A1* | 6/2003 | Pellegrino | B60L 53/305 |
| | | | 702/60 |
| 2003/0184492 A1* | 10/2003 | Chiang | H01Q 3/446 |
| | | | 343/833 |
| 2004/0075880 A1* | 4/2004 | Pepper | G01S 17/74 |
| | | | 359/212.1 |
| 2005/0234614 A1* | 10/2005 | Sakurai | B62D 5/0493 |
| | | | 701/33.7 |
| 2006/0256959 A1* | 11/2006 | Hymes | H04M 1/72547 |
| | | | 379/433.04 |
| 2007/0055184 A1* | 3/2007 | Echt | A61N 7/00 |
| | | | 601/2 |
| 2007/0120650 A1* | 5/2007 | Nagai | G06K 7/0008 |
| | | | 340/10.2 |
| 2007/0241864 A1* | 10/2007 | Nagai | G06K 7/0008 |
| | | | 340/10.1 |
| 2008/0294667 A1* | 11/2008 | Kopf | H04L 67/2828 |
| 2009/0283777 A1* | 11/2009 | Rather | B81B 7/02 |
| | | | 257/80 |
| 2010/0231389 A1* | 9/2010 | Zank | G06K 19/07735 |
| | | | 340/572.8 |
| 2011/0267235 A1* | 11/2011 | Brommer | H01Q 7/00 |
| | | | 342/457 |
| 2013/0121185 A1* | 5/2013 | Li | H04W 24/10 |
| | | | 370/252 |
| 2013/0286960 A1* | 10/2013 | Li | H04B 7/0684 |
| | | | 370/329 |
| 2014/0022109 A1* | 1/2014 | Lee | G01S 13/931 |
| | | | 342/70 |
| 2014/0182021 A1 | 6/2014 | Glueckstad et al. | |
| 2015/0340875 A1* | 11/2015 | Prasad | H02J 50/30 |
| | | | 307/104 |
| 2015/0355227 A1 | 12/2015 | Glueckstad | |
| 2015/0382205 A1* | 12/2015 | Lee | H04W 52/365 |
| | | | 370/329 |
| 2016/0049823 A1* | 2/2016 | Stein | H04W 4/24 |
| | | | 320/108 |
| 2016/0275790 A1* | 9/2016 | Kang | G07C 5/0866 |
| 2017/0353984 A1* | 12/2017 | Abdallah | H04L 5/0055 |
| 2019/0270431 A1* | 9/2019 | Clift | B60S 1/16 |
| 2020/0060660 A1* | 2/2020 | Waechter-Stehle | A61B 8/483 |

OTHER PUBLICATIONS

Charthad et al., "System-Level Analysis of Far-Field Radio Frequency Power Delivery for mm-Sized Sensor Nodes", IEEE Transactions on Circuits and Systems—I: Regular Papers, vol. 63, No. 2, Feb. 2016.

Tabesh et al., "A Power-Harvesting Pad-Less mm-Sized 24160GHz Passive Radio with On-Chip Antennas", ©2014 IEEE, 2014 Symposium on VLSI Circuits Digest of Technical Papers.

"The world's tiniest temperature sensor is powered by radio waves", Feb. 10, 2017, https://phys.org/news/2015-12-world-tiniest-temperature-sensor-powered.html.

International Search Report of the International Searching Authority for PCT/US2017/029868 dated Jul. 21, 2017.

* cited by examiner

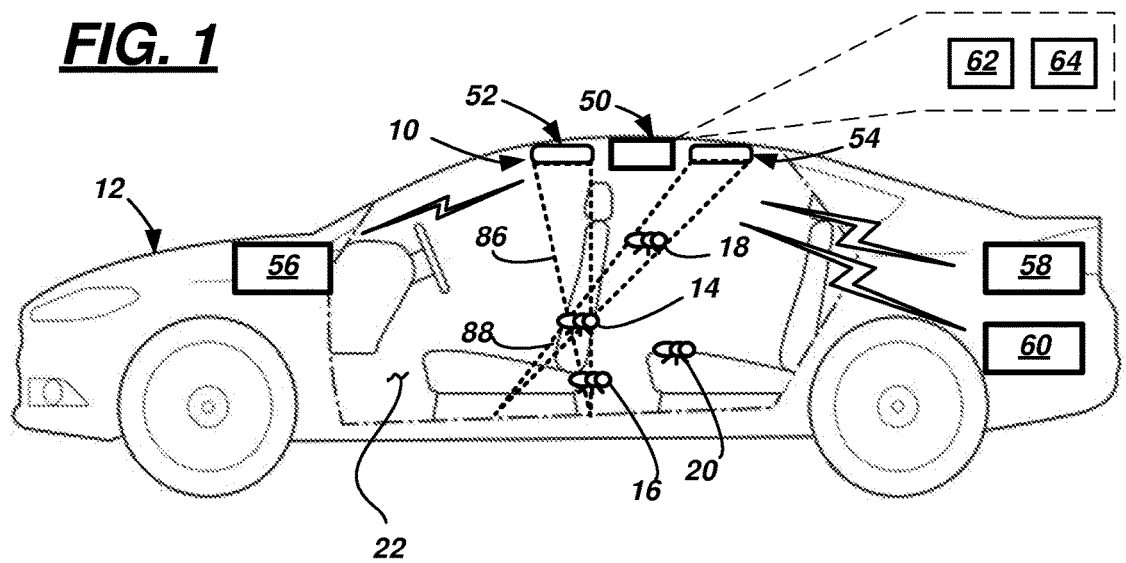
FIG. 1
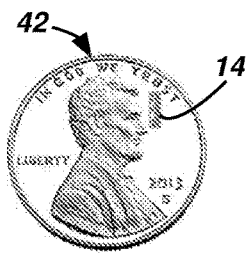
FIG. 2
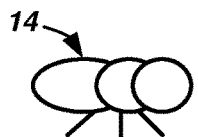
FIG. 3
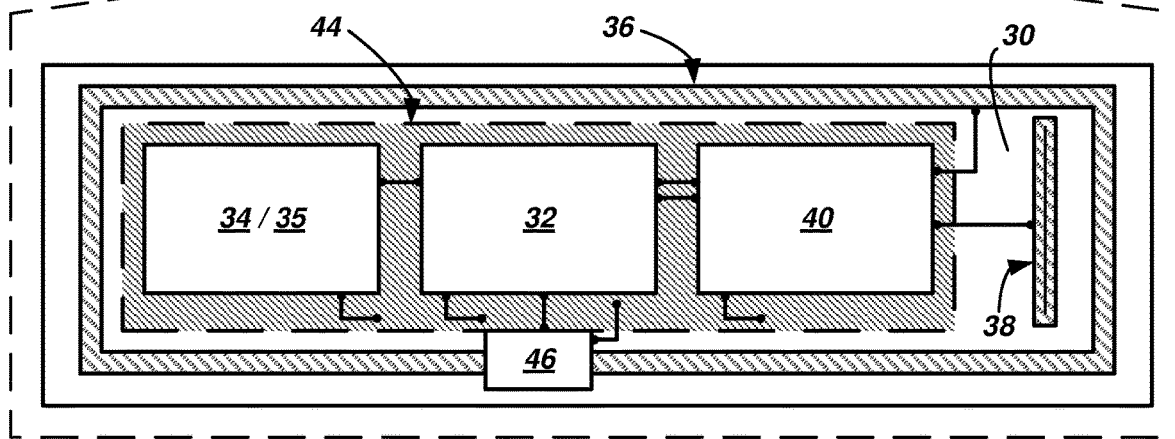

700

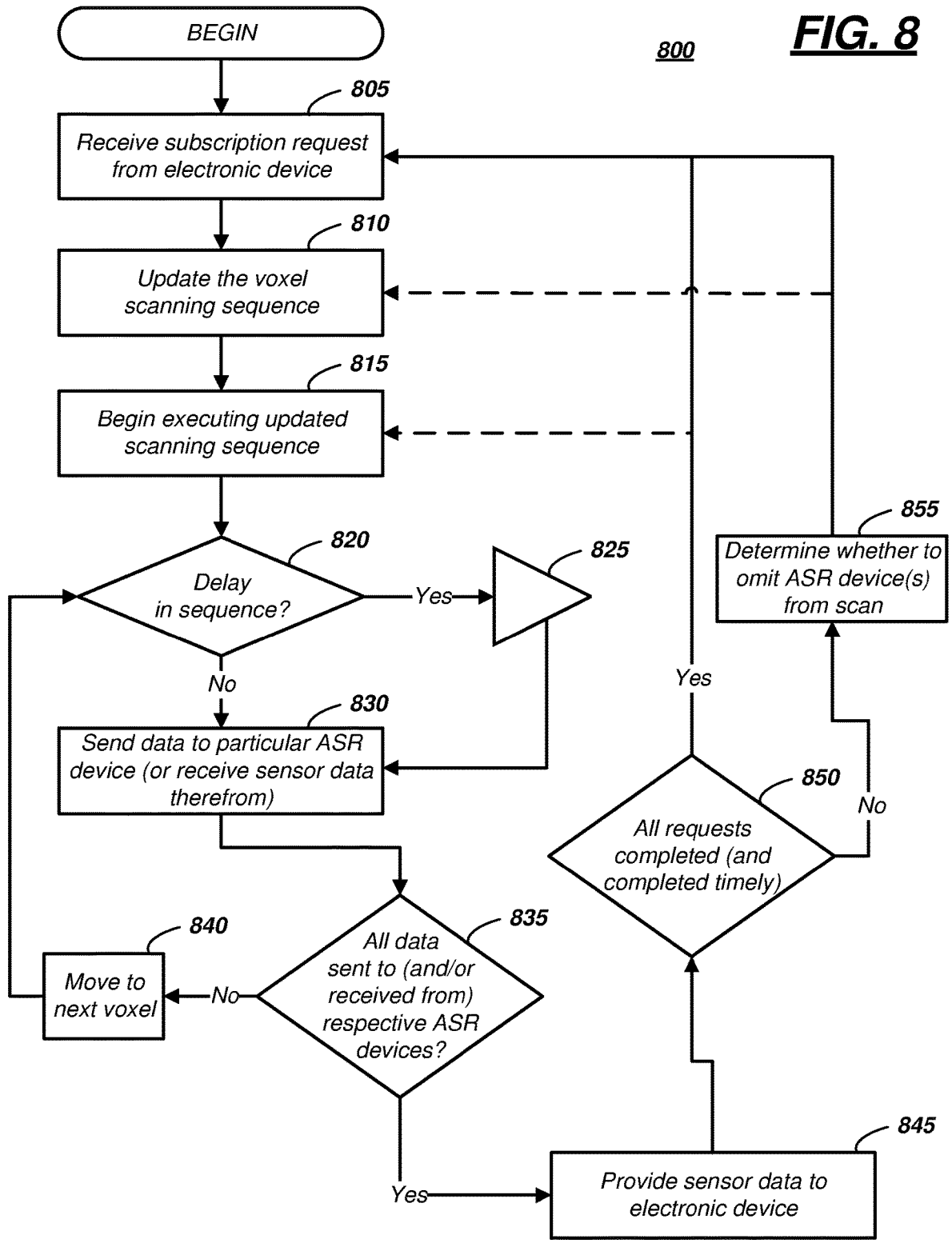

VEHICLE COMMUNICATION WITH ANT-SIZED RADIO DEVICES

BACKGROUND

In modern vehicles, a vehicle head unit may communicate by wire or wirelessly with vehicle sensors. For example, the sensors may be coupled to a vehicle bus and send data thereby to the head unit. Or the sensors may transmit data wirelessly via Bluetooth or other short range wireless protocols.

BRIEF DESCRIPTION OF THE DRAWINGS

FIG. 1 is a schematic diagram illustrating a gateway system in an exemplary vehicle.

FIG. 2 illustrates a United States one-cent piece and an example of an ant-sized radio (ASR) device illustrating scale.

FIG. 3 is a schematic diagram of an exemplary ASR device.

FIGS. 7-8 are flow diagrams illustrating processes of using the gateway system to communicate with ASR devices in the vehicle.

DETAILED DESCRIPTION

Figure 4:
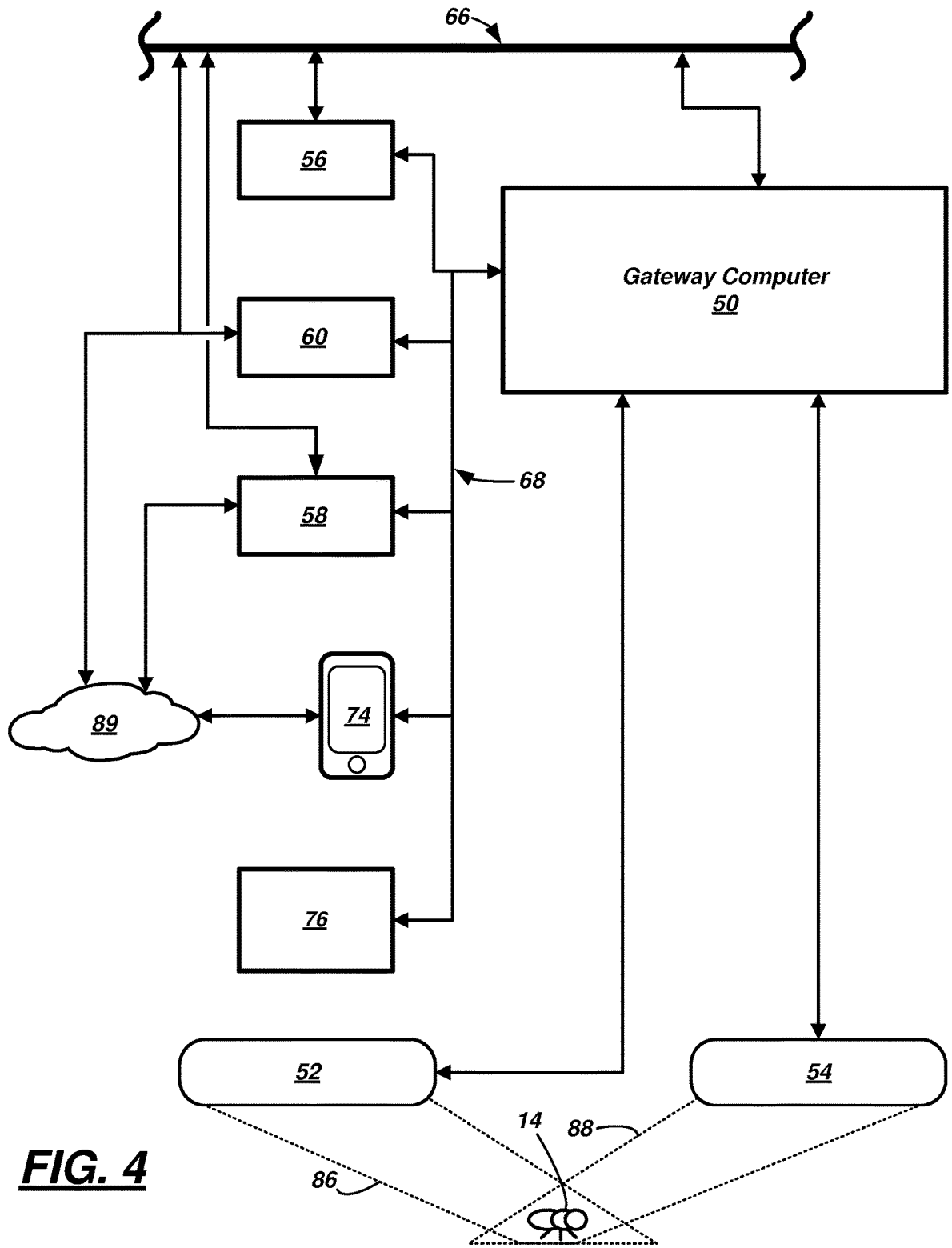
FIG. 4 is another schematic diagram of the gateway system, illustrating a gateway computer and first and second antennas coupled to the computer.

A gateway system for a vehicle is described that includes a gateway computer and a pair of antennas. According to one illustrative example, the gateway computer is programmed to: receive a request from a communication module in a vehicle to communicate with an ant-sized radio (ASR) device in the vehicle; in response to the request, concurrently steer two different radio frequency (RF) beams onto the ASR device; and based on steering the beams: transmit an instruction to the ASR device, or provide sensor data received from the ASR device to the module.

According to the at least one example set forth above, the ASR device is an electronic device comprising a substrate carrying a processor, at least one of a sensor or an actuator, a power-scavenging antenna, a transmitting or receiving antenna, and a radio, wherein the substrate has a spatial footprint that is less than 6 square millimeters.

According to the at least one example set forth above, the beams include a first RF beam having a first frequency and a second RF beam having a second frequency that is different from the first frequency.

According to the at least one example set forth above, the first RF beam includes a 20 GHz frequency and the second RF beam comprises a 60 GHz frequency.

According to the at least one example set forth above, one of the beams corresponds to a frequency via which a scavenging antenna on the ASR device can scavenge power from the respective beam, and the other of the beams corresponds to a frequency by which the ASR device can receive data, transmit data, or both.

According to the at least one example set forth above, the instruction was previously received by the computer in the request.

According to the at least one example set forth above, the instruction instructs the ASR device to send a trigger signal from an actuator therein.

According to the at least one example set forth above, the request includes a request for sensor data collected by a sensor in the ASR device.

According to the at least one example set forth above, a system includes: a first antenna that transmits a first RF beam, a second antenna that transmits a second RF beam, and the gateway computer described above coupled to the first and second antennas, wherein the computer is coupled to the module via at least one of a wired or wireless vehicle network connection.

According to the at least one system example set forth above, the first and second antennas are phase-array antennas.

According to the at least one system example set forth above, the system further includes the ASR device, wherein the ASR device is fixed within the vehicle.

According to the at least one example set forth above, the computer further is programmed to: determine a scanning sequence of a plurality of voxels within a cabin of the vehicle; scan the plurality of voxels for one or more ASR devices; associate an identifier of each of the discovered ASR devices with one or more voxel identifiers; and store the associated ASR device identifiers and voxel identifiers in computer memory.

According to the at least one example set forth above, the computer further is programmed to: determine an updated scanning sequence based on voxel identifiers that are associated with ASR device identifiers; re-scan the cabin based on the updated scanning sequence; and for each of the ASR devices in the sequence, attempt to perform one of the following: transmit an instruction to the respective ASR device, or receive, at the computer, sensor data from the respective ASR device.

According to the at least one example set forth above, the computer further is programmed to: receive a plurality of requests from one or more communication modules in the vehicle, wherein at least some of the requests include a delivery time or expiration data associated with the instruction or requested sensor data, wherein the instruction is not transmitted or the sensor data is ignored based on the delivery time or expiration data.

According to the at least one example set forth above, determining the updated scanning sequence is based in part on one or more delivery times or expiration data received in the plurality of requests.

According to another illustrative example, a method is described that includes: receiving a request from a communication module in a vehicle to communicate with an ant-sized radio (ASR) device in the vehicle; in response to the request, concurrently steering two different radio frequency (RF) beams onto the ASR device; and based on steering the beams: transmitting an instruction to the ASR device, or provide sensor data received from the ASR device to the module, wherein the instruction was previously received by the computer in the request.

According to the at least one method example set forth above, the beams include a first RF beam having a first frequency and a second RF beam having a second frequency that is different from the first frequency.

According to the at least one method example set forth above, the method also includes: determining a scanning sequence of a plurality of voxels within a cabin of the vehicle; scanning the plurality of voxels for one or more ASR devices; associating an identifier of each of the discovered ASR devices with one or more voxel identifiers; and storing the associated ASR device identifiers and voxel identifiers in computer memory.

According to the at least one method example set forth above, the method also includes: determining an updated scanning sequence based on voxel identifiers that are associated with ASR device identifiers; re-scanning the cabin based on the updated scanning sequence; and for each of the ASR devices in the sequence, attempting to perform one of the following: transmitting an instruction to the respective ASR device, or receiving, at the computer, sensor data from the respective ASR device.

According to the at least one method example set forth above, the method also includes: receiving a plurality of requests from one or more communication modules in the vehicle, wherein at least some of the requests include a delivery time or expiration data associated with the instruction or requested sensor data, wherein the instruction is not transmitted or the sensor data is ignored based on the delivery time or expiration data, wherein determining the updated scanning sequence is based in part on one or more delivery times or expiration data received in the plurality of requests.

According to at least one example, a computer is disclosed that is programmed to execute any combination of the examples set forth above.

According to at least one example, a computer is disclosed that is programmed to execute any combination of the examples of the method(s) set forth above.

According to the at least one example, a computer program product is disclosed that includes a computer readable medium storing instructions executable by a computer processor, wherein the instructions include any combination of the instruction examples set forth above.

According to the at least one example, a computer program product is disclosed that includes a computer readable medium that stores instructions executable by a computer processor, wherein the instructions include any combination of the examples of the method(s) set forth above.

Now turning to the figures, wherein like numerals indicate like parts throughout the several views, there is shown a gateway system 10 for a vehicle 12. The gateway system 10 facilitates communication between one or more ant-sized radio (ASR) devices (e.g., such as devices 14, 16, 18, 20) which may be carried by the vehicle 12 or by an occupant located in or around a cabin 22 of the vehicle 12; e.g., an occupant may carry one or more of ASR devices 14-20 in their personal belongings, clothing, or the like. In at least some examples, some of the ASR devices 14-20 may comprise a sensor which can provide information to the vehicle 12 and may be used by computing devices therein. And in some examples, some of the ASR devices 14-20 are coupled to vehicle modules or electronics and can comprise an actuator which can trigger ON/OFF states and the like of said modules or electronics. As will be explained more below, the ASR devices 14-20 may be triggered to an active mode by a threshold quantity of radio frequency (RF) energy. Accordingly, the gateway system 10 may be arranged and adapted to direct RF energy toward an ASR device thereby actuating a sensor or actuator therein. And in some instances, in response to the actuation, the ASR device may transmit sensor data to the vehicle 12 via the gateway system 10. Thereafter, one or more vehicle systems or computing devices may utilize this sensor data to perform one or more vehicle functions—as discussed in the examples set forth below. And in other instances, the ASR device may actuate one or more aspects of vehicle modules or electronics.

In FIG. 1, a passenger vehicle 12 is illustrated which includes the vehicle gateway system 10 which is adapted to interact with the ant-sized radio (ASR) devices 14-20. This type of vehicle is merely an example. Vehicle 12 also could be any suitable car, truck, sports utility vehicle (SUV), recreational vehicle, a bus, a marine vessel, an aircraft, or the like that similarly includes system 10. In at least some examples, vehicle 12 includes one or more onboard computers and driving systems to enable vehicle 12 to be operated in one or more autonomous driving modes; however, this is not required.

FIGS. 2-3 illustrate an exemplary ant-sized radio (ASR) device 14. In at least some examples, each of the ASR devices 14-20 may be identical; therefore, only one (ASR device 14) will be described herein. As used herein, an ant-sized radio device includes an electronic device comprising a substrate 30 carrying a processor 32, at least one of a sensor 34 or an actuator 35, a power-scavenging antenna 36, a transmit-receive antenna 38, and a radio 40, wherein the substrate 30 and components 32-40 have a spatial footprint that is less than 6 square millimeters (e.g., equal to or less than 1.5 mm by 4 mm), wherein antenna 36 is adapted to receive radio frequency (RF) power via a first channel or frequency, wherein antenna 38 is adapted to communicate (transmit and/or receive) via a second channel or frequency, wherein the first and second frequencies are different. For example, FIG. 2 illustrates that ASR device 14 may be approximately 1 mm by 3 mm—e.g., for purposes of scale, illustrating a United States one-cent piece (penny) 42 behind the ASR device 14.

As discussed above, the ASR device 14 may be located in the vehicle or carried by an occupant. Non-limiting vehicle examples include the ASR device 14 being located on a vehicle instrument panel, a vehicle door, a vehicle seat, a vehicle steering wheel, a vehicle floormat, a vehicle headliner, or electrically coupled to a vehicle human-machine interface, electrically coupled to a vehicle interior or exterior lamp, electrically coupled to a vehicle seat position actuator, etc. Non-limiting occupant-carried examples include the ASR device 14 being located in occupant apparel (e.g., woven or embedded within the fibers of the occupant's clothing, headwear, footwear, etc.), within or on occupant eyeglasses, jewelry, etc., within or on an adhesive film attached to the occupant or the occupant's clothing or adhered to an item carried by the occupant (e.g., a mobile phone exterior, a mobile phone case, a purse, a wallet, etc.), and/or even within one of the layers of the occupant's epidermis (e.g., such as a glucose monitoring device), within the occupant's ear (e.g., a cochlear device), etc. Thus, the location of the ASR device 14 may be fixed and/or electrically wired (e.g., in some vehicle implementations), or generally may be located within one or more occupant zones (e.g., within one of several three-dimensional volumes—associated with one or more vehicle seats), or may be randomly-located within the vehicle (e.g., if located on an item carried by an occupant—such as a mobile phone or an article of apparel which may be removed from the occupant's person). As discussed below, the vehicle gateway system 10 may be used to scan the vehicle cabin 22, learn and/or predict the location of the respective ASR devices in the vehicle, control the receipt of sensor data from the respective devices based the type of sensor data provided therefrom and/or the types of vehicle systems which use the sensor data, and control the actuation of respective vehicle devices electrically coupled to the ASR devices (e.g., based the type of vehicle devices, various user-vehicle circumstances, and the like).

ASR device substrate 30 may comprise a sheet of any suitable non-conductive material with sufficient rigidity to mechanically support components 32-40. It may have any suitable conductive wires or etched traces thereon for electrically coupling the components 32-40 to one another, as well as coupling all or some of components 32-40 to a ground plane 44 (shown in phantom) which may be on a reverse side or embedded between two sides of the substrate 30.

Non-limiting examples of processor 32 include a microprocessor, a microcontroller, an application specific integrated circuit (ASIC), or the like. In one example, processor 32 is an ASIC having limited functionality and internal memory. In some implementations, processor 32 may be programmed with an ASR identifier (e.g., such as an alpha-numeric value, an internet protocol (IP) address, or the like) and may execute a finite set of instructions such as: receive sensor data from the sensor 34 when the power-scavenging antenna 36 receives a threshold amount of RF energy associated with a first radio frequency (RF); prepare a message that includes the ASR identifier and at least a portion of the sensor data; and transmit the message via transmitting antenna 38 at a second RF frequency. Or the processor 32 may: receive an instruction wirelessly via antenna 38 when the power-scavenging antenna 36 receives the threshold amount of RF energy; and in response to the instruction, cause the actuator 35 to emit a trigger signal. The trigger signal could cause one or more electrically coupled vehicle modules or other vehicle electronics to turn ON or OFF, otherwise change states, or the like.

Sensor 34 may be any suitable electronic sensing element. Non-limiting examples include sensors which detect and/or measure: vehicle cabin temperature, vehicle cabin pressure, altitude, vehicle cabin humidity, vehicle cabin vibration, vehicle cabin shock, vehicle cabin carbon dioxide ($CO_2$) detection, volatile organic compound detection in vehicle 12, vehicle cabin reducing gas detection (e.g., nitrous oxide ($N_2O$), hydrogen sulfide ($H_2S$), etc.), vehicle oxidizing gas detection (e.g., sulfur dioxide ($SO_2$), nitrogen dioxide ($NO_2$), etc.), occupant body temperature, occupant perspiration, occupant heartrate, and shock or impulse at the occupant. According to one example, the sensor 34 may detect and/or measure sensor data when powered and/or triggered by the processor 32. Thus, as will be explained in greater detail below, sensor data may be used in a variety of applications—e.g., vehicle climate control, vehicle occupant detection, vehicle collision response systems, vehicle emergency systems, etc. Other sensor types and sensor data are also possible.

Actuator 35 may be any suitable electronic triggering element (e.g., such as a switch or the like). Actuator 35 may include interface components adapted to electrically couple the ASR device 14 to a vehicle device (e.g., such as a lamp) so that when the actuator 35 is driven by processor 32 (e.g., as a result of scavenging sufficient RF energy via antenna 36), the actuator triggers the device (e.g., triggers the lamp to the ON state). The lamp is merely one example; numerous other vehicle modules and/or electronics functions or features exist which could be triggered by the actuator 35. In at least one example, the actuator 35 is part of the processor 32—e.g., having its functionality incorporated into instructions executable by the processor 32.

Power scavenging antenna 36 may be an elongated element (e.g., strip, rod, etc.) of conductive material having a suitable length that enables the antenna 36 to receive a predetermined radio frequency. In at least one example, antenna 36 is arranged to define a loop on the substrate 30. For example, in the illustrated example, the loop of antenna 36 circumferentially encloses the other components 32-35, 38-40; however, this is not required. According to one example, the length of antenna 36 may correspond to a wavelength of a desired reception frequency (e.g., if the antenna 36 is adapted to receive a 20 GHz signal, then the length of the antenna 36 may be at least one wavelength (or approximately 15 mm)). In FIG. 3, a single loop is shown; however, the antenna 36 may comprise multiple loops as well.

The transmitting antenna 38 may be another elongated element (e.g., a strip, rod, etc.) of conductive material as well having a suitable length that enables the antenna 38 to transmit or receive a predetermined radio frequency. It also may be arranged as a loop; however, in at least the illustrated examples, antenna 38 extends straightly. In at least one example, antenna 38 may be shorter in length—e.g., arranged to transmit or receive RF energy at a different and higher frequency than that received via antenna 36. For example, according to one example, antenna 38 may be tuned to transmit at 60 GHz, while antenna 36 is tuned to receive at 20 GHz. Other frequency examples also exist—e.g., including examples wherein the antenna 38 is longer than the receiving antenna 36. As will be described more below, antenna 38 may be directed or steered toward a relatively weak RF signal of an ASR device—e.g., effectively filtering out other RF energy which might otherwise interfere with the desired RF signal, thereby enhancing reception of a particular RF signal.

Radio 40 may be a miniature radio adapted to transmit an RF signal over one or more radio channels; and in at least one example, radio 40 omni-directionally transmits and/or receives over a single channel. For example, radio 40 may be crystal-less (to minimize its size and power requirements) and may be constructed to transmit and/or receive at the second frequency discussed above (e.g., 60 GHz or the like). Micro-radios which are designed without crystals are known in the art; thus, these will not be described in greater detail here.

ASR device 14 also may comprise a rectifying circuit 46 for converting RF energy into a direct current (DC) at a voltage level and voltage ripple suitable to power processor 32. According to one non-limiting example, the circuit 46 includes a rectifier bridge comprising a number of resistive elements or traces in an arrangement known to those skilled in the art; of course, other rectifying examples also exist.

In operation, the ASR device 14 can be in an inactive mode when it is not receiving a threshold quantity of RF energy of the first frequency (e.g., associated with the scavenging antenna 36). According to one non-limiting example, ASR device 14 is inactive when it is not in the presence of a sufficiently-strong 20 GHz signal; however, this is merely one example (other frequency examples exist). However, when the ASR device 14 receives sufficient RF energy at the first frequency (or within a narrow bandwidth therearound), then ASR device 14 may operate in an active mode. For example, RF energy may be converted by the rectifying circuit 46 into electrical power, and this power may be provided to the processor 32, the sensor 34 (or actuator 35), and/or the radio 40. According to at least one active mode example, when the ASR device 14 receives a threshold amount of suitable RF energy, the processor 32 is triggered to receive sensor data from sensor 34 and instruct the radio 40 to transmit this data using the second frequency. As described above, any message transmitted by radio 40 may include an identifier of the ASR device 14; however, this is not required. According to one non-limiting example, the radio 40 may transmit at the second frequency using modulation techniques known in the art.

In other active mode examples, when the ASR device 14 receives a threshold amount of suitable RF energy via antenna 36 and/or an instruction is received via antenna 38, the processor 32 can cause the actuator 35 to output a digital high (e.g., a digital '1') or other suitable enable signal therefrom—e.g., to whatever device the actuator 35 is electrically coupled. In this manner, vehicle modules and/or electronics may be triggered to an ON state, to an OFF state, or to another predetermined state by actuating the actuator 35 onboard ASR device 14.

It should be appreciated that ASR devices 14-20 may be sized too small to include a number of features—e.g., too small for self-identifying geolocation devices or circuits, too small for synchronization or timing circuits, etc. In at least one example, each of the ASR devices 14-20 may not comprise an energy storage device. Further, based on size and power constraints, radio 40 may be capable of transmission distances of only 500 millimeters (mm). According to at least one example, low broadcast power enhances vehicle security—e.g., requiring malicious entities or eavesdroppers to be located in the cabin 22—which has a low probability of occurrence. While four ASR devices are shown (14-20), it should be appreciated that any quantity of ASR devices may be employed; thus, these are shown as merely examples.

Returning to FIG. 1, gateway system 10 may comprise a gateway computer 50, a first or power transmission antenna 52 which broadcasts RF energy at the first frequency (e.g., at 20 GHz or other suitable wavelength), and a second or transmitting or receiving (TX/RX) antenna 54 which transmits a command or instruction to the ASR devices 14-20 via an RF signal having the second frequency, or which receives sensor data from the ASR devices 14-20 via the RF signal having the second frequency. In general, computer 50 controls antennas 52, 54, as well as their directionality, range, etc. And by controlling antennas 52, 54, computer 50 can receive sensor data from the ASR devices 14-20 and provides this data to other computing devices within the vehicle 12 (e.g., related to climate control, safety and restraint systems, entertainment systems, just to name a few non-limiting examples), and/or computer 50 can actuate various modules and/or electronics in the vehicle 12 (e.g., such as illumination devices, vehicle head unit controls, audio controls, entertainment controls, vehicle seat controls, just to name a few non-limiting examples). In the illustrated example, gateway computer 50 sends and receives data to/from one of several communication modules 56, 58, 60, and thereafter, modules 56-60 can communicate with other suitable vehicle systems, electronic control modules in vehicle 12, vehicle electronics, or the like. Thus, in the illustrated example, gateway computer 50 and modules 56-60 can operate as pass-through devices—e.g., facilitating communication between the ASR devices 14-20 and other vehicle computing systems or electronics (or even between the ASR devices 14-20 and extra-vehicular computers or electronic communication systems). The use of modules 56-60 is of course merely an example; other communication architectures also exist. Further, in at least some examples, at least one of communication modules 56-60 does not act as a pass-through device—e.g., one of modules 56-60 may be the intended recipient of sensor data from a respective ASR device.

Figure 5:
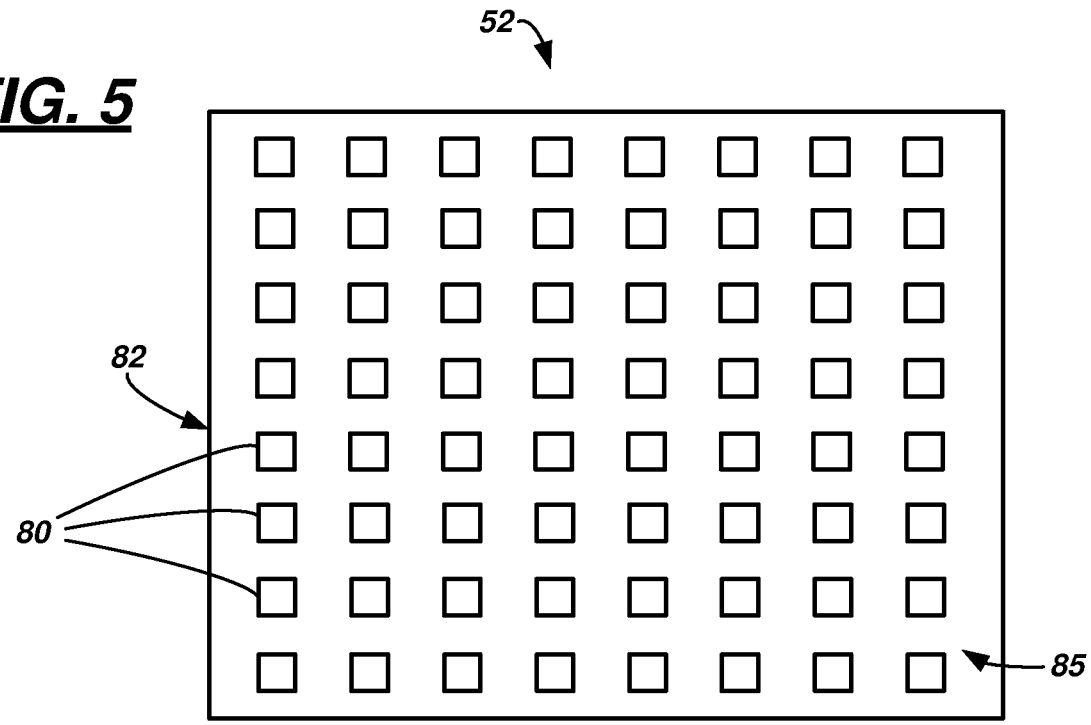
FIGS. 5-6 are schematic diagrams illustrating an example of the first or second antenna.
Figure 6:
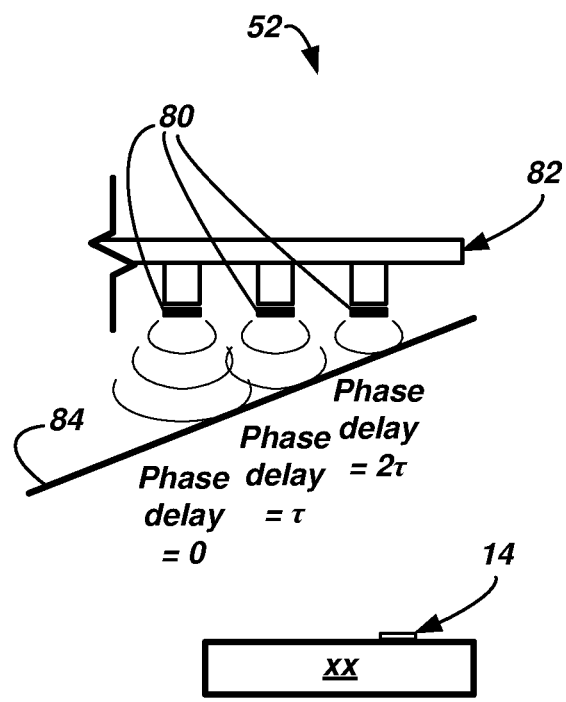

In general, computer 50 may include one or more processors 62 electronically coupled to memory 64, wherein the processor(s) 62 execute one or more instructions stored on memory 64. For example, processor(s) 62 can be any type of device capable of processing electronic instructions, non-limiting examples including a microprocessor, a microcontroller or controller, an application specific integrated circuit (ASIC), etc.—just to name a few. Memory 64 may include any non-transitory computer usable or readable medium, which may include one or more storage devices or articles—some of which may be respectively integral to the processor(s) 62. Other exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 64 may store one or more computer program products which may be embodied as software, firmware, or the like FIG. 4 is a schematic diagram illustrating gateway computer 50 coupled to antennas 52-54, each of communication modules 56-60 coupled to computer 50 via a wired vehicle network connection 66 and/or a wireless vehicle network connection 68, a mobile device 74 wirelessly coupled to computer 50, and a second ASR gateway module 76. Power transmission antenna 52 may be any suitable antenna device for transmitting RF power to the ASR devices 14-20. According to one example, antenna 52 may be phase-array antenna having multiple transmission nodes 80—e.g., carried by a substrate or frame 82 (see FIGS. 5-6). Each of the nodes 80 may be selectively controllable by gateway computer processor 62 so that the antenna 52 may generate a so-called effective wave front 84. For illustration purposes only, FIG. 6 shows three adjacent nodes each having a relative transmission times—e.g., a first node 80 having phase delay equal to zero, a second node 80 having phase delay equal to one period ($\tau$), and a third node 80 having phase delay equal to twice the period ($2\tau$)—e.g., wherein the period ($\tau$) is less than one period of the carrier signal. Of course, this merely illustrates a few of the nodes 80 (e.g., of an array 85 shown in FIG. 5). It should be appreciated that in two- and three-dimensional arrays, some nodes 80 may have the same transmission times as others. Phase-array antennas and the techniques for using them are known in the art—thus, this example of antenna 52 will not be described further herein.

TX/RX antenna 54 may be any suitable antenna device for transmitting and/or receiving RF signals to/from respective ASR devices 14-20. According to one example, antenna 54 is also a phase-array antenna having nodes similar to nodes 80—in a receiving mode, antenna 54 is adapted to improve the gain of any signal sent from one of the respective ASR devices 14-20.

FIGS. 1 and 4 illustrate beams 86, 88 associated with antennas 52, 54, respectively. The beams 86-88 may be defined by a three-dimensional volume (e.g., or lobe) that extends from the respective antenna 52, 54; further the beams 86-88 may be defined by a respective directionality and a respective range—each of which may be controlled by gateway computer 50. In at least one example, each beam 86, 88 extends from a surface of the respective antenna and converges at a predetermined range (e.g., that includes at least one ASR device); however, diverging beams are also possible. Thus, computer 50 may focus the RF energy of antenna 52 within beam 86 to power an ASR device while computer 50 focuses the transmission or reception of beam 88 via antenna 54 in order to communicate with this same ASR device. As will be discussed more below, in at least one example, gateway computer 50 focuses an intersection of the beams 86, 88 on a targeted ASR device (e.g., such as ASR device 14) in order to receive sensor data therefrom (or to cause the actuator 35 therein to actuate). For instance, in one non-limiting example, in order to communicate via antenna 54, ASR device 14 must be powered concurrently with RF energy from antenna 52—e.g., thus, the beams 76, 78 concurrently may intersect causing constructive interference. Alternatively, or in combination with the techniques discussed above, other beamforming and steering techniques can be employed as well.

Communication module 56 may be any suitable short range wireless communication computing device adapted to wirelessly communicate with suitable short range wireless vehicle sensors (not shown), mobile device 74, and other suitable electronics which may be onboard vehicle 12 and/or carried by occupants of vehicle 12. Non-limiting protocol examples include Wi-Fi, Bluetooth, Bluetooth Low Energy (BLE), dedicated short range communication (DSRC), etc., or a combination thereof. Module 56 may be programmed to receive sensor data from ASR devices 14-20 via gateway computer 50 and thereafter wirelessly transmit that sensor data to another electronic device—e.g., an onboard vehicle system, mobile device 74, another gateway computer 76 (e.g., configured and arranged similarly to gateway computer 50), etc. In addition, modules 56 may be programmed to send data, instructions, etc. to ASR devices 14-20 via gateway computer 50 so that vehicle systems can be triggered wirelessly for a variety of implementations. One non-limiting commercial example of module 56 is a Ford Sync™ module.

Communication module 58 may be any suitable vehicle-to-vehicle (V2V) communication computing device configured to wirelessly communicate with other roadway vehicles (e.g., via cellular communication, DSRC, or the like). Module 58 also may communicate with vehicle-to-infrastructure (V2I) as well, as will be appreciated by those skilled in the art. Module 58 may be programmed to facilitate communication of ASR device data between gateway computer 50 and one or more of other vehicles, roadway infrastructure, etc.

Communication module 60 may be any suitable telematics computing device configured to wirelessly communicate with other electronic devices via a cellular or other long-range communication link (e.g., LTE, GSM, CDMA, etc.). Module 60 may include an embedded cellular chipset or may facilitate cellular communication using the chipset of a mobile device within vehicle 12 carried by a user of vehicle 12 (e.g., a cellular phone, Smart phone, etc.). Module 60 may be programmed to facilitate communication of ASR device data between gateway computer 50 and one or more of a vehicle backend system, another vehicle, a remote server, a drone, etc. For example, module 60 may communicate with such terminal devices via one or more wired and/or wireless communication networks 89.

Networks 89 may include public switched telephone network (PSTN) such as that used to provide hardwired telephony, packet-switched data communications, internet infrastructure, and the like. Further, networks 90 may include wireless networks such as satellite communication architecture and/or cellular telephone communication networks that cover wide geographic regions (e.g., including eNodeBs, serving gateways, base station transceivers, and the like). Such land and wireless networks are known in the art and will not be described further herein.

Wired vehicle network connection 66 may enable wired communication between modules 56-60 and gateway computer 50. In addition, connection 66 may facilitate communication between other computing devices onboard vehicle 12 (e.g., non-limiting examples of which include human-machine interface devices, a vehicle navigation system, a vehicle climate control system, a vehicle powertrain system, and a vehicle onboard diagnostics (OBDII) system, just to name a few examples). In at least one example, the connection 66 is a vehicle intranet system and includes one or more of a controller area network (CAN) bus, Ethernet, Local Interconnect Network (LIN), a fiber optic connection, or the like. In some examples, connection 66 may include one or more discrete wired connections as well. In this manner, connection 66 facilitates communication between ASR devices 14-20 and these and other vehicle systems.

Wireless vehicle network connection 68 may include a suitable wireless local area network (e.g., including but not limited to Wi-Fi), peer-to-peer communication links (e.g., including but not limited to Bluetooth, BLE, Wi-Fi Direct, Dedicated Short Range Communication (DSRC), etc.), a combination thereof, or any other suitable form of short-range wireless communication. Connection 68 may facilitate communication between computer 50 and communication modules 56-60, as described above. Alternatively, or in combination therewith, connection 68 may facilitate communication between gateway computer 50 and mobile device 74. Connection 68 similarly facilitates communication between ASR devices 14-20 and the exemplary vehicle systems discussed above.

Mobile device 74 may be any portable electronic device adapted for two-way wired and/or wireless communication. Non-limiting examples of mobile device 74 include a cellular telephone, a personal digital assistant (PDA), a Smart phone, a laptop or tablet computer having two-way communication capabilities (e.g., via a land and/or wireless connection), a netbook computer, and the like. In some examples, device 74 may control one or more ASR device actuators 35 or receive sensor data from one or more ASR device sensors 34.

Figure 7:
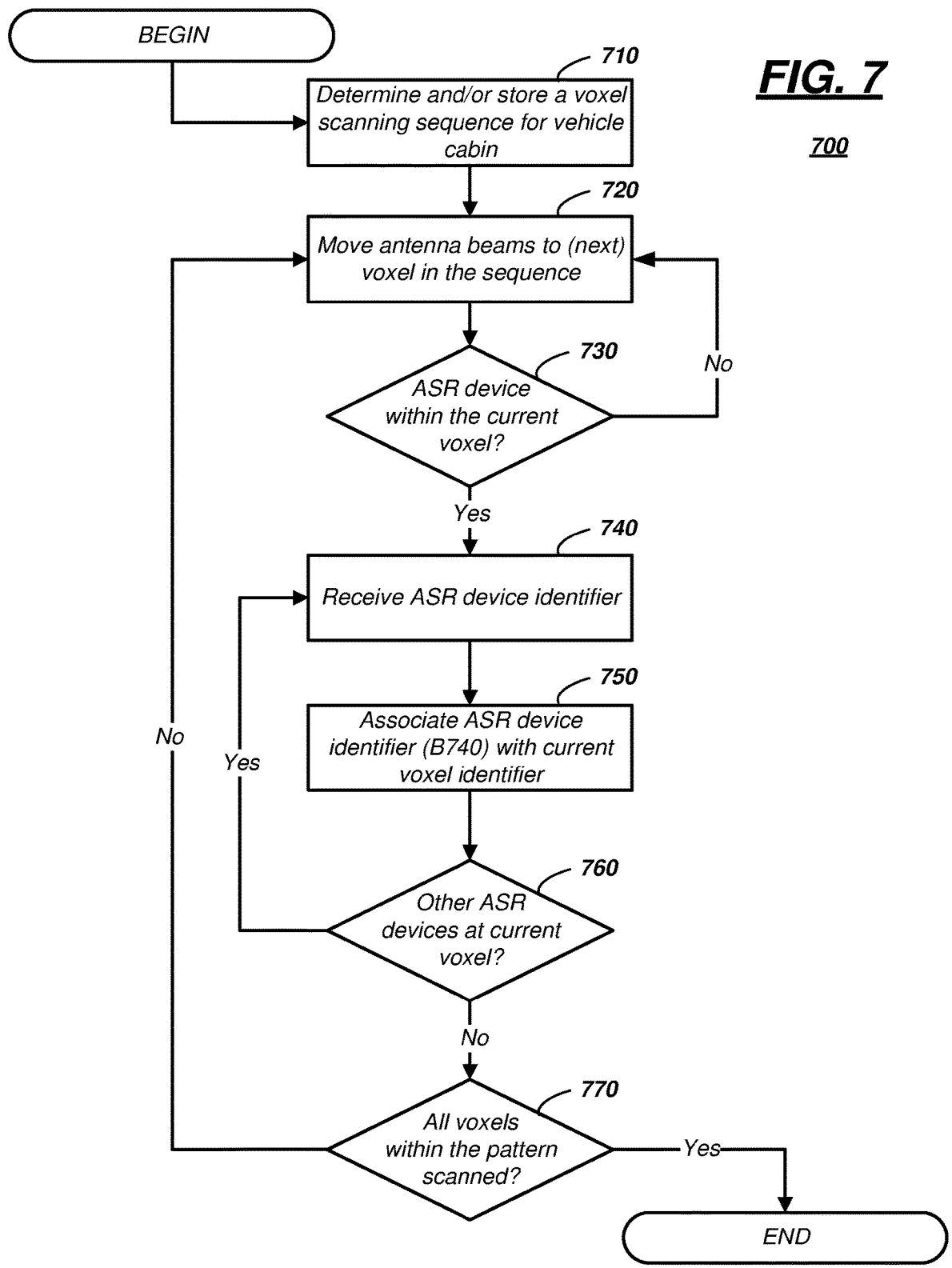

Turning now the flow diagrams shown in FIGS. 7-8, processes 700 and 800 illustrate, respectively, a process for determining ASR device location and a process for selectively communicating with the ASR devices in accordance with the ASR device locations determined in process 700. Each of the processes 700, 800 can comprise instructions carried out by the gateway computer 50—e.g., instructions which may be stored in memory 64 and executed by processor 62.

Process 700 begins with block 710. In block 710, computer 50 determines a voxel scanning sequence for vehicle cabin 22. As used herein, a voxel is a volumetric portion of cabin 22. Typically, most voxels are the same size, and voxels which are located at the peripheral region of the cabin are less than this size and defined partially by the shape of the cabin interior (e.g., the doors, headliner, instrument panel, seats, etc.). In one example, voxels located in a middle region of the cabin 22 could be 8 cubic inches (e.g., 2"×2"×2"); however, this is merely an example. Voxels could be smaller and/or larger than 8 inches$^3$. Accordingly, cabin 22 could comprise thousands of voxels. Computer 50 may determine the size and quantity of voxels within the cabin 22. Accordingly, computer 50 may divide or parcel the cabin in any suitable fashion. Further, computer 50 may assign each voxel a unique identifier.

According to the scanning sequence, computer 50 may steer the beams 86, 88 and control to convergence of the beams 86, 88 in order to intersect the beams at a selected voxel. The scanning sequence includes determining which voxels to scan, the order in which to scan the voxels, and a linger interval at each voxel (e.g., before proceeding to the next voxel in the sequence). According to one example, computer 50 scans a single voxel at a time; however, in other examples, computer 50 may control the width of beam 86 and/or 88 in order to scan multiple voxels concurrently.

According to block 710, at least initially, computer 50 may determine to scan all voxels in the vehicle 12 to identify the locations of any or all ASR devices (e.g., such as devices 14-20). For example, computer 50 may determine to control beams 86, 88 to systematically scan all voxels in the cabin 22—e.g., proceeding from a first voxel to an adjacent voxel, to a subsequently adjacent voxel, to a subsequently adjacent voxel, etc.

In block 720 which follows, computer 50 initiates the scanning sequence. For example, antennas 52, 54 control the directionality and range of the beams 86, 88 to focus on a first voxel in the scanning sequence.

In block 730, computer 50 determines whether an ASR device is within the current voxel. According to one example, when the beams 86, 88 are focused on a voxel having an ASR device (e.g., ASR device 14), then the device 14 may be programmed to transmit its identifier. In this manner, computer 50 may discover whether an ASR device is present. If no ASR device is identified within the current voxel, the process 700 loops back and repeats block 720—e.g., proceeding to the next voxel in the scanning sequence. However, if the computer 50 determines the presence of an ASR device in the current voxel, then process 700 proceeds to block 740.

In block 740, computer 50 receives the identifier from ASR device 14 via antenna 54 (e.g., according to one example, the identifier is an IP address). In block 750 which follows, computer 50 associates this identifier with the current voxel identifier. In this manner, in the future, computer 50 may attempt to communicate with the ASR device 14 without having to first locate it within the cabin 22 which might otherwise require scanning a number of empty voxels again (i.e., voxels void of ASR devices). In this manner, computer 50 improves scanning efficiency.

In block 760 which follows, computer 50 may determine whether other ASR devices are located in the current voxel. For example, computer 50 may have received more than one ASR device identifier in response to focusing beams 86, 88 on the current voxel. If this occurred, process 700 may loop back to block 740 and repeat the association process (e.g., again associating and/or storing a different ASR device identifier with the current voxel identifier). Of course, in some instances, this may occur concurrently with the previous execution of blocks 730-750. This loop may repeat itself until all ASR devices within the current voxel have been associated with the particular voxel identifier. After which, process 700 proceeds from block 760 to block 770.

In block 770, computer 50 determines whether all voxels in the scanning sequence have been scanned. In at least one example, all voxels have not been scanned; consequently, process 700 loops back to block 720, and the process continues as described above. During the sequence, ASR devices 16-20 similarly may be associated with respective voxel identifiers (e.g., which may differ from one another).

In block 770, if computer 50 determines that all the voxels in the sequence have been scanned, then process 700 may end.

Process 700 may be executed repeatedly immediately following its prior completion or at any suitable later time. In this manner, computer 50 may determine the locations of new ASR devices in cabin 22 (e.g., since the last scan), update the locations of previously-scanned ASR devices (e.g., which may have moved within the cabin 22), and/or determine which ASR devices may no longer be located in cabin 22. Further, the scanning sequence in block 710 may vary from scan to scan as well. In addition, as will be explained more below, in at least one example, process 700 may be executed piecemeal—e.g., scanning portions of cabin 22 during process 800 (e.g., during so-called downtime and in accordance with the execution of a schedule, as discussed below).

Turning now to FIG. 8, a process 800 is illustrated for selectively communicating with the ASR devices (e.g., devices 14-20, other ASR devices, etc.) using the location data obtained in process 700. As discussed above, in process 700, the last-identified voxel locations of a plurality of ASR devices may be stored in memory 64. Process 800 may begin by computer 50 executing block 805—receiving at computer 50 a subscription request from an electronic device. The electronic device may be one of communication modules 56-58, mobile device 74, another gateway computer 76, just to name a few non-limiting examples. The subscription request may include a request to send data (e.g., an instruction) to one or more ASR devices or to receive data (e.g., sensor data) from one or more ASR devices. Alternatively, or in combination therewith, the request could pertain to sending data to and/or receiving data from any ASR devices within a predetermined voxel in the cabin 22 (e.g., several ASR devices may sense temperature within a voxel—e.g., on different surfaces of an object therein—and this data may be useful to a vehicle system (e.g., a climate control system or the like)).

According to one non-limiting example, the request may comprise one or more of the following elements: a voxel identifier, an ASR device identifier, an instruction to send to an ASR device in the identified voxel, preprocessing or formatting instructions associated with the instruction, a delivery timestamp (e.g., a specific time or a time range when the computer 50 should attempt to deliver the instruction to a respective ASR device or a specific time or time range when the computer 50 should attempt to receive sensor data from the respective ASR device), instruction expiration data, etc. Expiration data may identify to the computer 50 when an instruction is stale—i.e., when the instruction should no longer be sent to the respective ASR device—e.g., if the instruction has not already been sent. Or e.g., the expiration data may identify to computer 50 when the electronic device considers sensor data collected from the respective ASR device to be stale and not suitable for delivery to the requesting electronic device (e.g., should be ignored). For example, if the respective ASR device provides sensor data to the computer 50, the computer 50 stores the sensor data until the electronic device requests to receive it, and a time of expiration passes—then, the computer 50 may delete or otherwise ignore the collected sensor data. The request may comprise other information as well; these elements are merely examples.

Block 805 further may include storing and providing a variety of information to electronic devices which may request subscriptions. For example, in addition to storing voxel identifiers associated with ASR device identifiers, computer 50 may store in memory 64 ASR device characteristics (e.g., whether the respective ASR device comprises a sensor or actuator, what type of sensor, what it actuates, etc.) and/or pre-processing instructions (e.g., instructions to alter communicated data (e.g., baseline manipulation, transient compression, data normalization, data scaling, etc.). In this manner, electronic devices may query computer 50, and in response, computer 50 may provide information regarding what ASR devices are available to be actuated or provide sensor data.

In block 810 which follows, computer 50 may determine and/or update the voxel scanning sequence determined in block 710. For example, in process 700, all voxels within the cabin 22 may have been scanned. Accordingly, computer 50 may have determined which of those voxels are 'empty'— i.e., no ASR device is contained within the volume thereof. Hence, updating the voxel scanning sequence may include omitting—at least temporarily—those empty voxels. Further, updating the voxel scanning sequence of block 710 may comprise assessing which subscription requests include timestamps and expiration data—and then determining a scanning schedule based on the timestamps and expiration data from a plurality of subscription requests. Thus, the schedule can be incorporated into the scanning sequence so that the sequence, when executed by the computer 50, attempts to timely send and/or receive data to/from each of the respective ASR devices. Further, in block 810, computer 50 may determine the updated scanning sequence based at least partially on updated linger intervals. For example, a linger interval for a particular voxel may be extended based on a higher quantity of ASR devices determined (in process 700) to be therein; similarly, other linger intervals may be shortened based on fewer ASR devices being located therein.

In block 815, computer 50 begins executing the updated scanning sequence—scanning a first voxel. This will not be re-described as it may be similar to block 720 described above, except that computer 50 may be executing a different scanning sequence.

In block 820 which follows, computer 50 may determine whether the sequence calls for a delay (e.g., in sending instructions or in receiving sensor data)—e.g., according to the schedule. If a delay or downtime determined, process 800 proceeds to block 825 (delaying for a determined interval of time) and then proceeds to block 830. If no delay is determined, process 800 may proceed directly to block 830.

According to at least one example, during this delay, computer 50 may execute a portion of the scanning sequence set forth in process 700—e.g., in order to update the ASR device locations in cabin 22. When the delay period ends, computer 50 may revert back to process 800—proceeding to block 830.

In block 830, computer 50 may send data (e.g., an actuation instruction) to the ASR devices in the current voxel and/or receive data (e.g., sensor data) from the ASR devices in the current voxel. As this has been described above, this will not be described in greater detail here.

In block 835 which follows, the computer 50 may determine whether communication with all ASR devices in the scanning sequence has occurred—e.g., either sending data to or receiving it therefrom. If this has not occurred, then computer 50 moves to the next voxel (block 840), and process 800 loops back and repeats block 820 for that voxel. If in block 835 communication between computer 50 and all ASR devices in the scanning sequence has occurred, then process 800 proceeds to block 845.

In block 845, any sensor data collected via the scanning sequence may be provided to the requesting electronic device. In some examples, this could occur during the execution of the scanning sequence (e.g., during the execution blocks 815-835); in other examples, it may occur once the scanning sequence is completed. Further, in at least one example, the sensor data received from some of the ASR devices 14-20 may be stored temporarily at computer 50 (e.g., in memory 64)—e.g., until the respective electronic device calls for it. As described above, if the electronic device does not call for it prior to its expiration, computer 50 may delete or overwrite the data (e.g., considering it stale).

In block 850 which may follow, computer 50 may determine whether any subscription requests (received prior to blocks 810-815) were not completed or fulfilled (or were not completed timely). This may occur for a number of different reasons. For example, an ASR device may be unable to communicate with the computer 50. For instance, the use of beams 86, 88 may require a line-of-sight (LOS) between the antennas 52, 54 and the respective ASR device—if LOS was not possible during the scanning sequence, then the respective ASR device may not communicate with computer 50 when the beams 86, 88 were focused on its respective voxel. In other examples, the ASR devices may have moved out of the previously-associated voxel—e.g., recall that while some ASR devices are fixed, others may be attached to an occupant's person (e.g., wearable, clothing, etc.) (e.g., the occupant may have moved his or her arm, changed vehicle seats, etc.). Further, the respective ASR device could malfunction rendering it unable to communicate with computer 50 via beams 86, 88. These are merely non-limiting examples, and others exist. Thus, in block 850, computer 50 identifies which, if any, requests were not completed. If all requests were completed (and completed timely), then process 800 proceeds to block 805 and/or block 815—e.g., depending on whether new subscription requests are available. And if at least one request was not completed or completed timely, then process 800 proceeds to block 855 before then proceeding to blocks 805 or 810.

In block 855, computer 50 may determine to omit one or more ASR devices from a subsequent scan. For example, computer 50 may determine to omit a respective ASR device from the next scan because an occupant carrying the device left the vehicle (e.g., this may be based upon use of other suitable vehicle sensors). Or for example, computer 50 may determine to omit the respective ASR device after a threshold number of scans in which the ASR device was not detected. Other examples are also possible.

Following block 855, the process 800 proceeds to block 805 if new subscription requests are available or to block 810 if they are not. In block 810, the updated voxel scanning sequence may be based at least partially on the omission of one or more ASR devices previously scanned.

The process 800 may proceed while the vehicle ignition is in an ON state—and in some examples, even when the vehicle ignition state is OFF. In addition, it should be appreciated that the instructions stored in memory 64 and executable by processor 62 of computer 50 are adaptive. That is, in at least one example, computer 50 operates in a learning mode, wherein it repeatedly may determine an optimal scanning sequence that not only satisfies the time requirements set forth in the subscription requests, but also scans a predetermined set of voxels in the least amount of time.

Thus, there has been described a gateway system for a vehicle. The system includes a gateway computer, a first antenna, and a second antenna. The computer is programmed to control the first and second antennas in order to acquire data from one or more ant-sized radio (ASR) devices in the vehicle—or to provide one or more instructions to the ASR devices therein. In order to facilitate communication, the computer is programmed to steer radio frequency beams associated with the respective first and second antennas to intersect at a volumetric location of an ASR device. The respective ASR device can be equipped to scavenge power from the beam of the first antenna and to transmit or receive data via the second beam.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above. According to at least one example, an RDBMS may be used to implement the previously-described publish and subscribe features (e.g., between the gateway computer 50 and the communication modules 56-60).

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer, programmed to:
receive a request from a communication module in a vehicle to communicate with an ant-sized radio (ASR) device in the vehicle;
in response to the request, concurrently steer two different radio frequency (RF) beams onto the ASR device; and based on steering the beams: transmit an instruction to the ASR device, or provide sensor data received from the ASR device to the module,
wherein the instruction instructs the ASR device to send a trigger signal from an actuator therein.

2. The computer of claim 1, wherein the ASR device is an electronic device comprising a substrate carrying a processor, at least one of a sensor or an actuator, a power-scavenging antenna, a transmitting or receiving antenna, and a radio, wherein the substrate has a spatial footprint that is less than 6 square millimeters.

3. The computer of claim 1, wherein the beams include a first RF beam having a first frequency and a second RF beam having a second frequency that is different from the first frequency.

4. The computer of claim 3, wherein the first RF beam comprises a 20 GHz frequency and the second RF beam comprises a 60 GHz frequency.

5. The computer of claim 1, wherein one of the beams corresponds to a frequency via which a scavenging antenna on the ASR device can scavenge power from the respective beam, wherein the other of the beams corresponds to a frequency by which the ASR device can receive data, transmit data, or both.

6. The computer of claim 1, wherein the instruction was previously received by the computer in the request.

7. The computer of claim 1, wherein the request includes a request for sensor data collected by a sensor in the ASR device.

8. A system, comprising: a first antenna that transmits a first RF beam, a second antenna that transmits a second RF beam, and the computer of claim 1 coupled to the first and second antennas, wherein the computer is coupled to the module via at least one of a wired or wireless vehicle network connection.

9. The system of claim 8, wherein at least one of the first and second antennas are phase-array antennas.

10. The system of claim 8, further comprising the ASR device, wherein the ASR device is fixed within the vehicle.

11. The computer of claim 1, wherein the computer further is programmed to: determine a scanning sequence of a plurality of voxels within a cabin of the vehicle; scan the plurality of voxels for one or more ASR devices; associate an identifier of each of the discovered ASR devices with one or more voxel identifiers; and store the associated ASR device identifiers and voxel identifiers in computer memory.

12. The computer of claim 11, wherein the computer further is programmed to: determine an updated scanning sequence based on voxel identifiers that are associated with ASR device identifiers; re-scan the cabin based on the updated scanning sequence; and for each of the ASR devices in the sequence, attempt to perform one of the following: transmit an instruction to the respective ASR device, or receive, at the computer, sensor data from the respective ASR device.

13. The computer of claim 12, wherein the computer further is programmed to: receive a plurality of requests from one or more communication modules in the vehicle, wherein at least some of the requests include a delivery time or expiration data associated with the instruction or requested sensor data, wherein the instruction is not transmitted or the sensor data is ignored based on the delivery time or expiration data.

14. The computer of claim 13, wherein determining the updated scanning sequence is based in part on one or more delivery times or expiration data received in the plurality of requests.

15. A method, comprising:
receive a request from a communication module in a vehicle to communicate with an ant-sized radio (ASR) device in the vehicle;
in response to the request, concurrently steering two different radio frequency (RF) beams onto the ASR device;
based on steering the beams: transmitting an instruction to the ASR device, or provide sensor data received from the ASR device to the module, wherein the instruction was previously received by the computer in the request;
determining a scanning sequence of a plurality of voxels within a cabin of the vehicle;
scanning the plurality of voxels for one or more ASR devices;
associating an identifier of each of the discovered ASR devices with one or more voxel identifiers; and
storing the associated ASR device identifiers and voxel identifiers in computer memory.

16. The method of claim 15, wherein the beams include a first RF beam having a first frequency and a second RF beam having a second frequency that is different from the first frequency.

17. The method of claim 15, further comprising: determining an updated scanning sequence based on voxel identifiers that are associated with ASR device identifiers; re-scanning the cabin based on the updated scanning sequence; and for each of the ASR devices in the sequence, attempting to perform one of the following: transmitting an instruction to the respective ASR device, or receiving, at the computer, sensor data from the respective ASR device.

18. The method of claim 17, further comprising: receiving a plurality of requests from one or more communication modules in the vehicle, wherein at least some of the requests include a delivery time or expiration data associated with the instruction or requested sensor data, wherein the instruction is not transmitted or the sensor data is ignored based on the delivery time or expiration data, wherein determining the updated scanning sequence is based in part on one or more delivery times or expiration data received in the plurality of requests.

19. A computer, programmed to:
receive a request from a communication module in a vehicle to communicate with an ant-sized radio (ASR) device in the vehicle;
in response to the request, concurrently steer two different radio frequency (RF) beams onto the ASR device;
based on steering the beams: transmit an instruction to the ASR device, or provide sensor data received from the ASR device to the module;
determine a scanning sequence of a plurality of voxels within a cabin of the vehicle;
scan the plurality of voxels for one or more ASR devices;
associate an identifier of each of the discovered ASR devices with one or more voxel identifiers; and
store the associated ASR device identifiers and voxel identifiers in computer memory.

* * * * *